INVENTOR

JAMES E BRITT

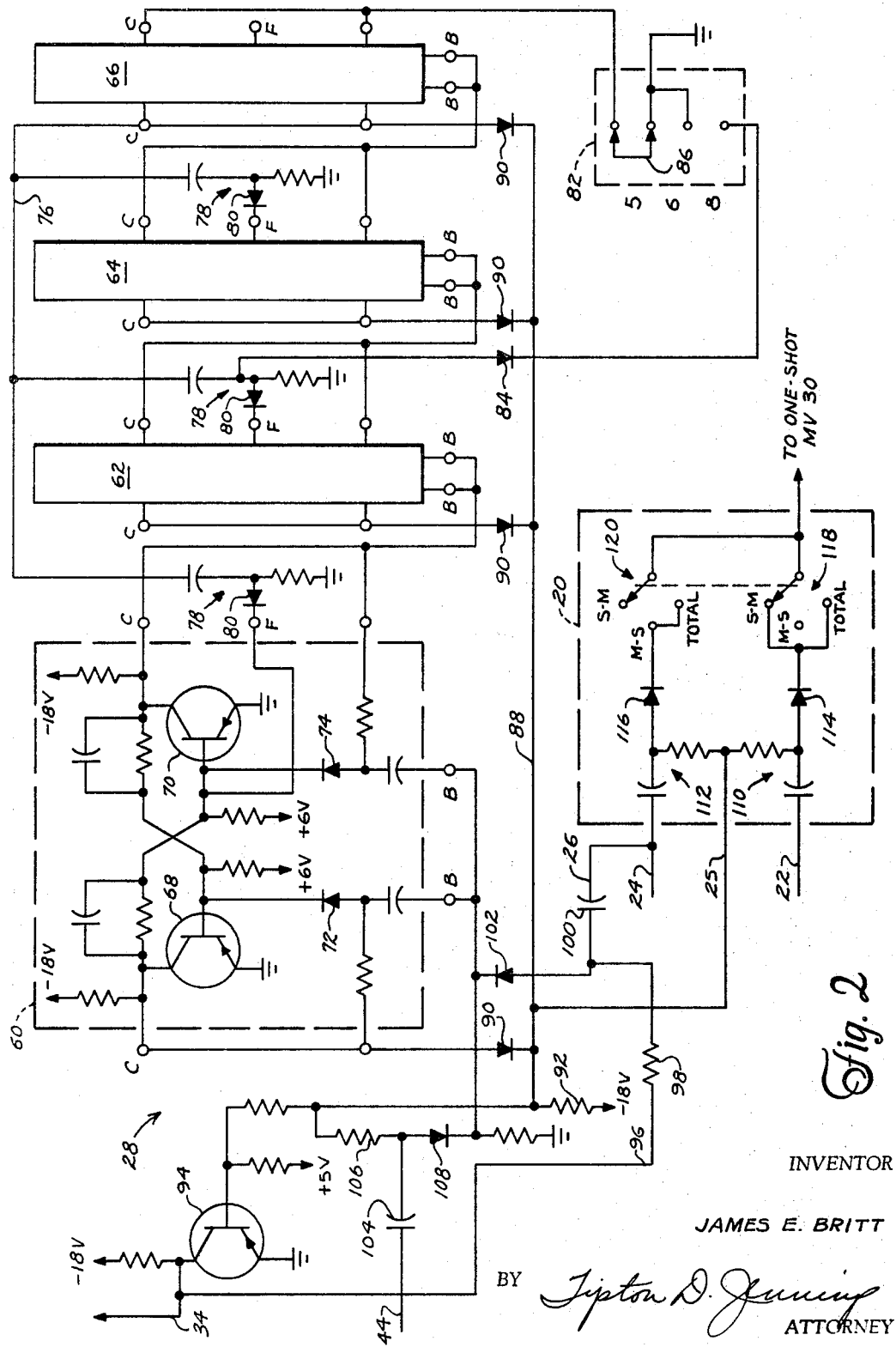

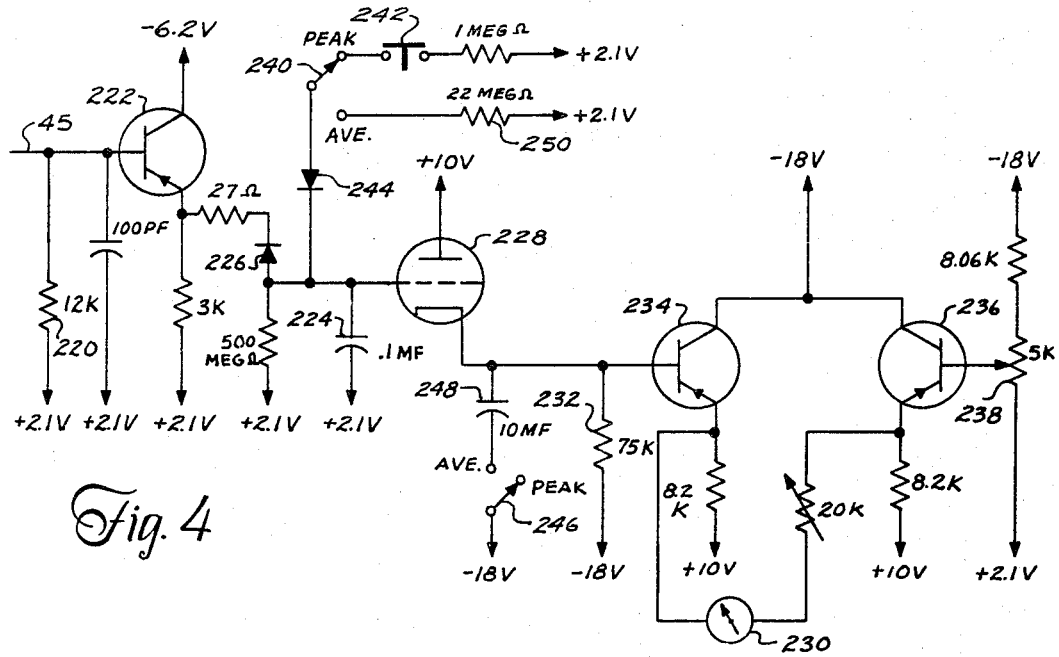
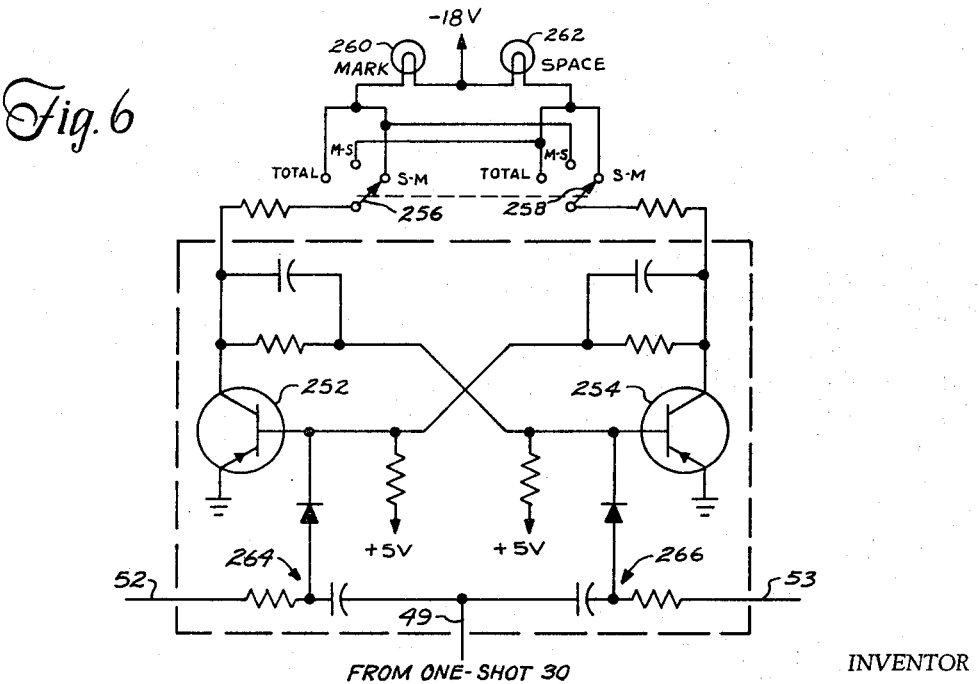

United States Patent Office 3,420,950
Patented Jan. 7, 1969

3,420,950
PULSE DISTORTION TESTING APPARATUS
James E. Britt, Annandale, Va., assignor to The Susquehanna Corporation, a corporation of Delaware
Filed Feb. 5, 1965, Ser. No. 430,688
U.S. Cl. 178—69                    11 Claims
Int. Cl. H04l 25/02

ABSTRACT OF THE DISCLOSURE

An embodiment of the pulse distortion testing apparatus is a start-stop telegraph or data pulse distortion measuring set which employs both digital and analog techniques. During the character timing period, pulses are generated and counted in an up-down pulse counter, the zero count occurring at the ideal transition points of the input pulse train. The counter output is continuously converted to an up-down current staircase. The occurrence of an actual transition in the input pulse train gates the instantaneous value of current to a meter to give an accurate percentage reading of distortion.

---

This invention relates to apparatus for testing distortion of pulses in a pulse train and more particularly to apparatus for measuring and indicating pulse distortion in telegraph signals.

Telegraph distortion may be conveniently divided into four types. The various types of distortion that affect telegraph signals are marking bias, spacing bias, spacing end distortion and marking end distortion. Any of these types or combinations of these types can be introduced into a telegraph signal by some asymmetrical conditions such as voltage imbalance, improper relay adjustment, or changes in the received signal strength which may cause all marks to be either too long or too short.

By "marking bias" is meant that the space-to-mark transition of each marking pulse in a start-stop telegraph signal has been advanced with respect to the normal space-to-mark transition. In like manner, the term "spacing bias" designates a condition wherein the space-to-mark transition of each marking pulse is retarded with respect to the normal space-to-mark transition. The term "marking end distortion" refers to a condition where the mark-to-space transition of each marking pulse in a signal is retarded with respect to the normal mark-to-space transition. Conversely, the term "spacing end distortion" indicates a condition wherein the mark-to-space transition of each marking pulse in a signal is advanced with respect to the normal mark-to-space transition.

Distortion testing apparatus of a wide variety has been developed and used to measure distortion in telegraph signals. The apparatus disclosed herein differs from previous apparatus in that it employs a novel combination of both digital and analog techniques to obtain a precise measurement and indication of distortion.

Accordingly, an object of this invention is to provide a new and improved distortion testing apparatus.

Another object is to provide such apparatus employing a novel system of measuring and indicating distortion by the use of both digital and analog techniques.

A further object is to provide such apparatus which with one exception is completely solid-state in construction and is light-weight and thereby portable to facilitate field-testing.

Still another object of this invention is to provide a start-stop distortion testing apparatus in which the displacement of all transitions of the pulses is measured with reference to the start pulse.

A still further object is to provide start-stop telegraph distortion testing apparatus capable of operating with a variety of inputs having different code formats and transmission speeds, and also capable of giving both peak and average distortion readings.

Figure 1:
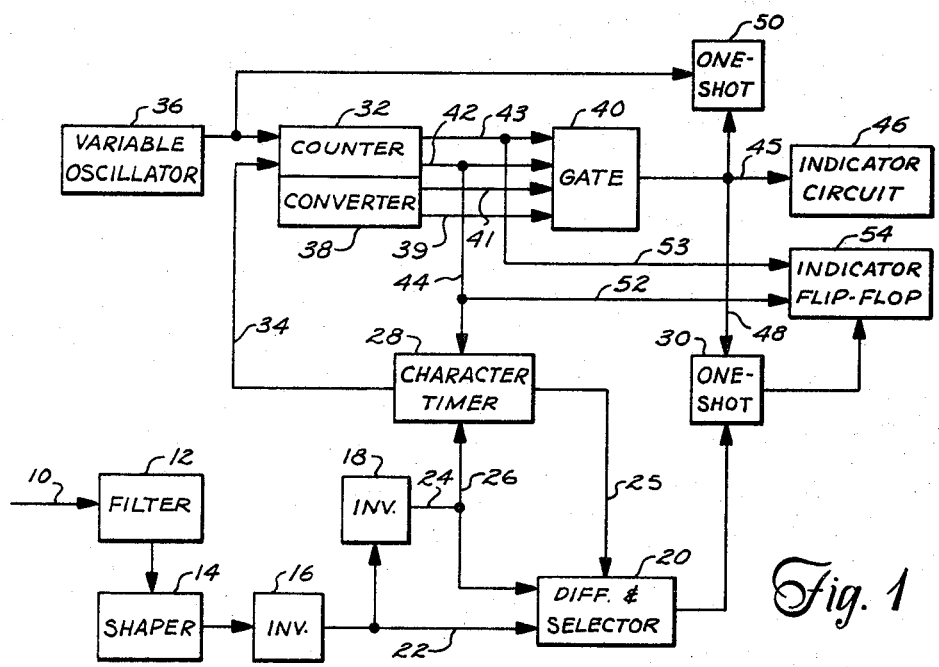
Figure 5:
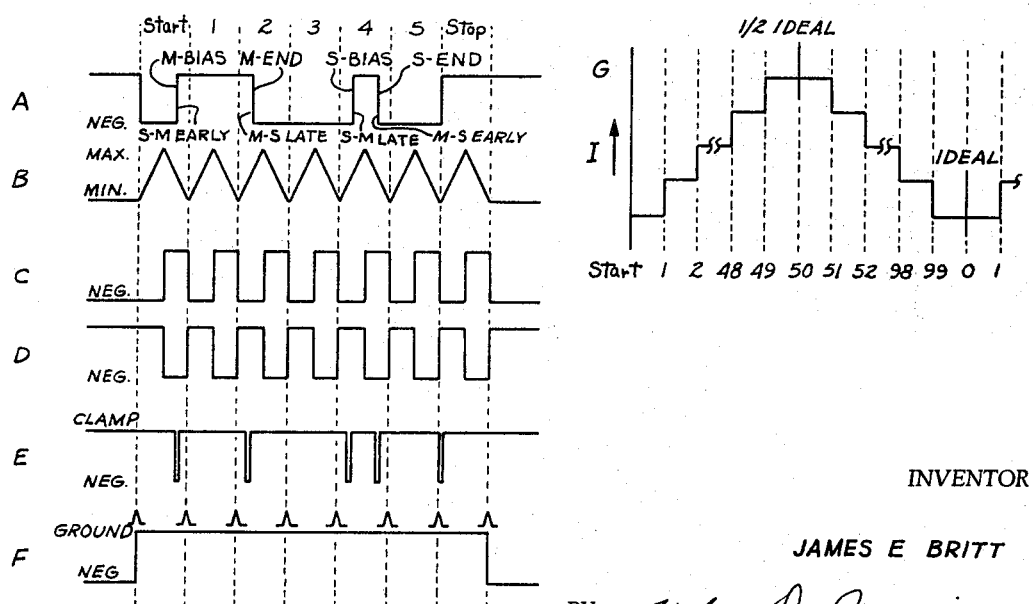
Figure 3:
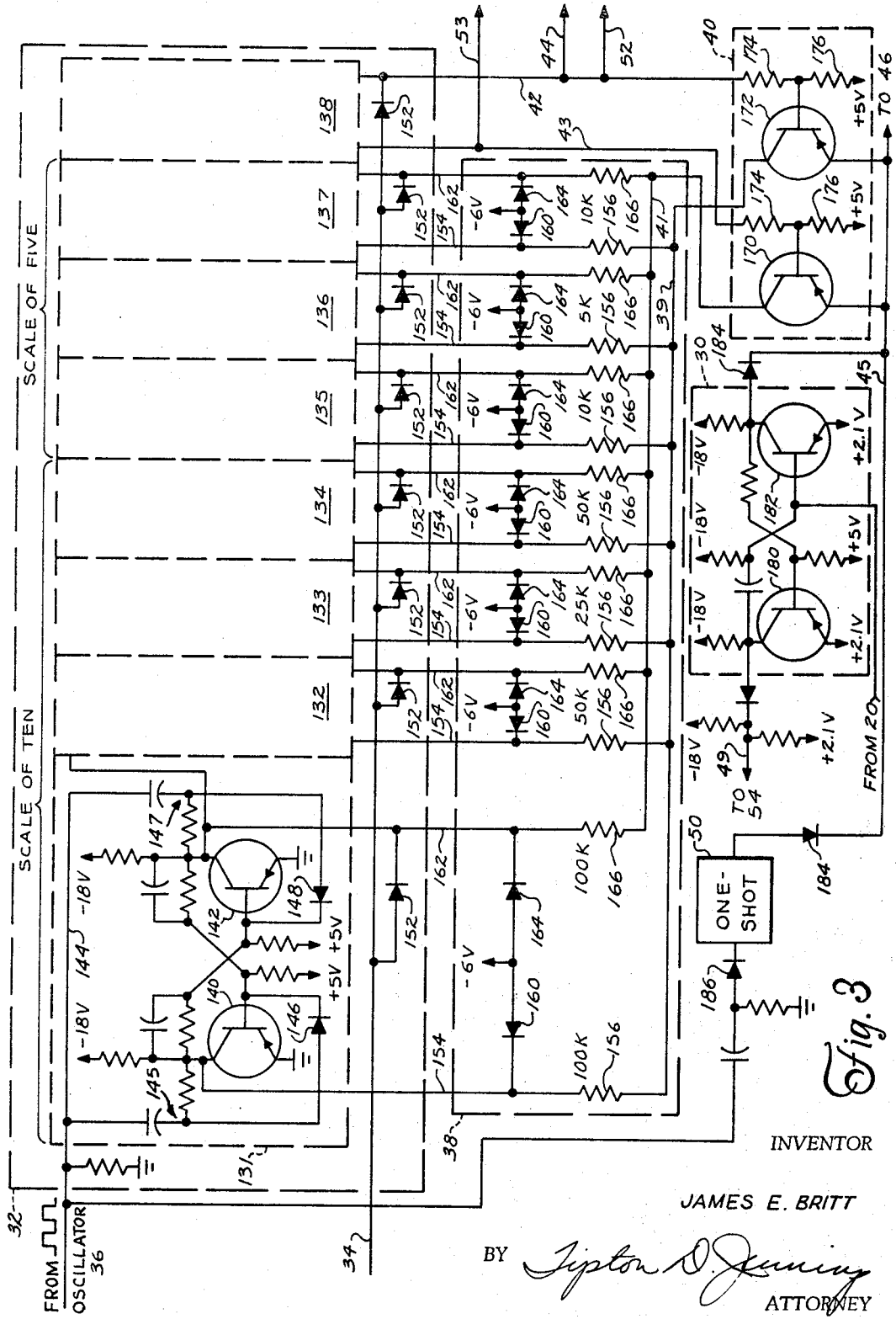

Other objects and advantages of the present invention will become apparent from a reading of the following detailed description, when considered in conjunction with the accompanying drawings wherein:

FIGURE 1 is a block diagram of the preferred embodiment of the present invention;

FIGURES 2 to 4, inclusive, and FIGURE 6 show schematics of circuits corresponding to selected blocks shown in the block diagram of FIGURE 1; and FIGURE 5 is a chart illustrating waveforms at various points in the system and which are used in describing the invention.

In general, pulse distortion testing apparatus embodying the invention includes a timing circuit whose timing cycle is initiated by a transition in the incoming signal, a pulse generator, and a counter for counting the output pulses of the pulse generator during the timing cycle. A converting circuit continuously converts the changing count in the counter to an electrical analog, preferably current. In response to an actual transition in the incoming signal during the timing cycle, the precise value of current which is then present is applied to indicating circuitry to indicate the amount of distortion.

Referring to FIGURE 1, the block diagram discloses pulse distortion testing apparatus for use by personnel in testing coded signals such as start-stop and synchronous telegraph signals in order to ascertain if distortion in the signal is occurring and, if so, to measure and indicate the amount and the type of this distortion. In start-stop telegraph circuits, which will be referred to in describing this apparatus, each character is represented by a start space pulse of unit length followed by a number of information mark or space unit pulses and then a stop mark pulse which may be of unit pulse length or longer. The code level determines the number of information pulses in the character. In five-level, six-level and eight-level code, there are respectively five, six and eight information pulses bracketed between the start and stop pulses in a character.

The incoming telegraph signals are applied on line 10 to filter circuit 12 which prevents undesired transients such as relay bounce from being measured. The signals are then applied to an input shaping circuit 14 for squaring the input pulses. This circuit is preferably a PNP transistor switch biased to conduct at the half-current values of the spacing pulses and to remain nonconducting for marking pulses. An example of suitable input filter and shaping circuits, except for component values, is shown in U.S. Patent 3,106,608, issued to the present inventor. Connected in tandem at the output of shaping circuit 14 are two inverting circuits 16 and 18, the output of each being connected to block 20 by lines 22 and 24 respectively. Block 20 contains differentiating and rectifying circuits and a transition selector. The inverting circuits 16 and 18 can be the type shown as transistor switches TR 102 and TR 103, together with their associated components, in FIGURE 2 of U.S. Patent 3,106,608. When one of these inverters conducts, its output taken at its collector is at approximately ground and when it is nonconducting its output is at approximately negative battery.

It is being assumed that the input signal being applied on line 10 is the distorted character shown in line A of FIGURE 5. Although line A depicts a character containing four types of distortion, this will rarely occur; however for purposes of this description, this character is being used to facilitate an understanding of the operation of this invention. The output waveform of inverter 16 is as shown in line A. The output waveforms of shaper 14, which also inverts, and of inverter 18 are the inverse of line A. Accordingly, inverter 16 conducts and its output undergoes a positive excursion on space-to-mark transitions of the input signal while inverter 18 conducts and its output undergoes a positive excursion on mark-to-space transitions of the input signal.

With the arrival of the character shown in line A of FIGURE 5, the start pulse causes a mark-to-space transition and actuates the shaping circuit 14. Inverter 16 goes nonconducting, and inverter 18 conducts. The positive excursion appearing on line 24 is applied via line 26 to the character timer 28 to start the timing cycle. With the start of the timing cycle a clamp on line 25 is removed by character timer 28 from circuit 20 so that following the start transition selected actual transitions in the character can pass through circuit 20 to activate one-shot multivibrator 30.

The character timer 28 is constructed as a counter which is adjustable to count a specified number of ideal pulses, based upon the code level of the input signal as hereinafter explained, so that the timing cycle will terminate during the stop pulse of the incoming character. This timing cycle is shown on line F of FIGURE 5. It is during this timing cycle that the distortion measurements will occur.

With the start of the timing cycle a clamp on line 34 is removed from counter 32 to permit counter 32 to begin the counting of pulses applied by variable oscillator 36. Oscillator 36 is conventional and is preferably a crystal-controlled oscillator which provides a precise output pulse rate to counter 32. Its variability is obtained by using several crystals which permit a variety of output pulse frequencies, the frequency chosen being determined by the frequency of the input telegraph signal. Preferably, the pulse frequency chosen is a multiple of the baud rate of the input signal; for example, for the present description the frequency of oscillator 36 is 100 times the baud rate. Thus, beginning with the start transition 100 pulses from oscillator 36 are repeatedly counted by counter 32 until the end of the timing cycle, every 100th pulse establishing the end of an ideal pulse period known as the ideal pulse point or ideal transition point.

Counter 32 is designed as a series of binary circuits arranged as a decade scaler, quinary scaler and binary scaler to attain the count of one-hundred. Although the counter is digital its output if represented by a current analog by virtue of converter 38 connected to the outputs of the binary circuits. The output current of converter 38 is proportional to the count in counter 32 and steps to a new current level for each new count in counter 32. The output of converter 38 is applied on lines 39, 41 to gate 40 which is controlled by the last stage of counter 32 via lines 42, 43. This control effects a sawtooth output current from gate 40 as illustrated on line B of FIGURE 5. Each sawtooth is actually an ascending and descending staircase as represented by the enlarged view on line G. As can be seen the current begins at a minimum value initially at the start transition, and subsequently at each ideal pulse point, and steps up to a maximum at the one-half ideal pulse point and then steps down again reaching the minimum at the ideal pulse point. Each step in the staircase is caused by a pulse from oscillator 36 being counted in counter 32. The last stage of counter 32 also sends a signal on line 44 to advance character timer 28 at each ideal pulse point.

The output line 48 of one-shot or monostable multivibrator 30 normally clamps the output line 45 out of gate 40 so that the output current is shunted away from the indicating circuit 46. One-shot 30 has a duration of 15 microseconds in its unstable state, and is triggered by selected actual transitions in the input signal to remove the clamp for this time period.

For this general discussion it is assumed that the selectors in circuit 20 are positioned to pass all actual transitions. Following the start pulse an early space-to-mark transition occurs for pulse number one signifying marking bias. Counter 32 is in its first cycle and the output of gate 40 would be stepping down to its minimum level. A positive excursion which appears on line 22 at the actual transition point is differentiated in circuit 20 and used to trigger one-shot 30. For 15 microseconds the clamp on line 48 is removed as shown in line E. The current which is present at the output of gate 40 at this time passes to the indicating circuit 46 which responds to this precise value of current to give an accurate indication of the amount of distortion. At the end of the 15 microsecond period, multivibrator 30 switches back to its stable state and the clamp is reapplied to gate 40, preventing further output current from reaching the indicating circuit until a subsequent transition.

The next transition in the character is a late mark-to-space transition signifying marking end distortion. Counter 32 is now in its third counting cycle and the current at the output of gate 40 would be undergoing positive steps to the one-half ideal point. A positive transition appears on line 24 and is applied to circuit 20 where it is differentiated and used to trigger again one-shot 30. The clamp on line 48 is once again removed for 15 microseconds to permit the value of current then at the output of gate 40 to pass to the indicating circuit 46.

Subsequent transitions in the input character, which as shown in line A, connote spacing bias and spacing end distortion respectively, also operate to actuate in turn one-shot 30 to permit the current then appearing at the output of gate 40 to pass to circuit 46 for the 15 microsecond period.

Each time the oscillator 36 emits a pulse to counter 32 it also triggers a second one-shot multivibrator 50. When triggered, one-shot 50 switches to its unstable state and applies a clamp to the output of gate 40 for four microseconds to prevent current from passing to the indicating circuit 46. This action gives the counter and accordingly the converter four microseconds to respond to the oscillator pulse and to stabilize, which prevents an erroneous reading from reaching circuit 46 should the clamp from one-shot 30 at that time be absent.

Also connected to the last stage of counter 32 is a second indicator circuit 54 formed as a flip-flop. The outputs of the last stage of counter 32 are applied via lines 52, 53 to indicator circuit 54 to condition this circuit to receive a triggering input from a second output of one-shot 30 when it is switched to its unstable state. The indicator 54 contains lamps whose illumination in combination with the position of its selectors will indicate the type of distortion whose quantity is shown by measuring and indicating circuit 46. In this manner an operator knows immediately which type of distortion is present. This circuit will be described later in more detail.

In summary it has been shown that the arrival of the start pulse initiates the timing period during which period ideal pulse points are established with reference to the start of the start pulse. If the actual transitions in the incoming character are displaced with reference to these ideal pulse points, an indication of distortion will occur. The described apparatus has in practice proven to be an effective combination of both digital and analog techniques. Digital logic is employed to perform the counting functions to establish a stable measurement base referenced to the start pulse and which maintains its accuracy over repeated counter cyclings during the character timing period. With this accuracy firmly fixed, conversion to an analog system immediately follows. The particular analog system employed carries forward this accuracy through subsequent steps in the measurement process to give precise indications of quantity of distortion when distortion occurs. This changeover to an analog system eliminates the need for complex digital storage circuitry, digital comparison circuitry, and other circuits required to carry out a complete digital system.

As previously mentioned the last stage or binary circuit of counter 32 transmits a signal on line 44 to character timer 28 upon the occurrence of every ideal transition point. As shown by the character in line A of FIGURE 5 the input signal is a five-level code. The character timer 28 is set to count a total of eight input signals, consisting of the start input and thereafter the seven stepping inputs on line 44. Upon receipt of the seventh input from counter 32 which occurs when the character is in the stop pulse, character timer 28 resets to terminate the timing cycle. The clamp on line 34 is restored to prevent the counter 32 from operating in response to further input pulses from oscillator 36. This latter clamp also serves to insure that this counter is reset to zero. No further measurements occur until a subsequent mark-to-space transition reinitiates a new timing cycle. In practice the system will soon synchronize with the signals on the input line 10 so that this mark-to-space transition referred to is the start pulse of a character. When character timer 28 resets it also restores the clamp to circuit 20 so that no transition can trigger one-shot 30 until after the start pulse is received.

FIGURE 2 shows the preferred construction of the character timer 28 as well as the schematic of circuit 20. The character timer is constructed as a counter having four binary stages connected in cascade. The total count which the counter will reach before resuming its original or zero state is variable and the particular count selected depends upon the code level of the input signal being measured. Variability is attained by feedback control through a selector switch which determines which of the first three stages will be effected by the feedback signal from the fourth stage.

Within the block 60, defined by the dotted lines, is a flip-flop circuit forming the first stage of the character timer. Stages 62, 64 and 66 are also flip-flops and are constructed identically to the circuit shown in block 60. As seen by the schematic of block 60 the flip-flop is conventional and comprises two transistors 68 and 70 together with their associated components, including steering diodes 72 and 74 to steer the positive input pulses to the base of the conducting stage. The drive or trigger input to each flip-flop is applied to the terminals labeled B. All outputs from all stages are taken from their terminals labeled C, connected to the collectors of the two transistors, as shown in representative block 60. The drive or trigger output from each of the first three stages is taken from its right-side transistor collector and applied to the B inputs of the next adjacent stage. Feedback to the first three stages is applied on line 76 from the left-side collector of the fourth stage 66 to the inputs labeled F of the first three stages. Line 76 terminates at each feedback input with a differentiating circuit 78 and a diode 80.

The right-side transistor collector of flip-flop 66 is connected to switch 82. The differentiating circuit 78 at the F input of the second stage 62 is connected by diode 84 also to switch 82. Switch 82 has three positions labeled 5, 6 and 8 respectively, each position corresponding to a code level of the input telegraph signal and determining the number to which the character timer 28 will count before it resets. For position 5 the character timer 28 will count to eight, for position 6 it will count to nine, and for position 8 it will count to eleven. Sliding contact 86 in switch 82 applies ground to the right-side collector of the fourth flip-flop 66 in posiiton number 5 and applies ground to diode 84 in the position number 8.

The left-side collector of each stage is connected to line 88 through a diode 90. When the character timer is in an inactivated state line 88 will be at some negative potential level established by resistor 92 and conducting transistor 94. All the diodes 90 will be back-biased. When the character timer is activated one or more of the diodes 90 is always forward-biased because one or more of the left-side collectors in the four flip-flops is at ground potential. Line 88 will therefore during the character timing period rise to ground potential and remain there for the duration of the cycle. At the end of the character timing period line 88 returns to its original negative potential level.

When the character timer is inactivated the collector of transistor 94 is at ground potential and the ground clamp appears on line 34 to the counter 32 shown in FIGURE 1. Line 96 is also connected to this collector and applies a ground path through resistor 98 to capacitor 100 at this time and diode 102 is forward-biased. Thus the start pulse which is applied to the character timer 28 by line 26 can be differentiated by the combination of capacitor 100 and resistor 98 and applied through diode 102 to the input of the first stage 60 of the character timer to initiate the timing cycle. Stepping inputs to advance the character timer 28 arrive from the last stage of counter 32 (FIGURE 1) on line 44. The combination of capacitor 104 and resistor 106 forms a differentiating circuit for these inputs. Diode 108, which passes these differentiated signals to the inputs B of the first stage 60, is back-biased when the character timer is off, and forward-biased when on.

Line 25 on which the clamp is applied to circuit 20 terminates at line 88. Internally of circuit 20, line 25 is connected to differentiating circuits 110 and 112. Because line 88 and accordingly line 25 goes to ground only after the start of the character timer, the clamp is not removed until that time. Accordingly, no signals can pass through either differentiating circuit except during the character-timing period and after the start transistion has passed. Rectifying diodes 114 and 116 pass only the positive spikes from the differentiating circuits 110 and 112 respectively to selector switches 118 and 120. These two switches have three positions and are ganged to operate together. The first position permits passage through switch 118 of the positive spikes signifying space-to-mark transitions in the incoming signal. In the second position switch 120 passes positive spikes signifying mark-to-space transitions in the incoming signal. In the third position labeled "TOTAL," positive spikes are passed by both switches signifying all transitions in the incoming signal subsequent to the start transition. Every positive spike out of circuit 20 is applied to one-shot multivibrator 30 shown in FIGURE 1 to trigger this multivibrator to its 15 microsecond unstable state.

The operation of the character timer and other circuits shown in FIGURE 2 is as follows. Prior to the arrival of a character such as shown in line A of FIGURE 5, line 88 is at a negative potential value, transistor 94 is conducting, and diode 108, diodes 90 and diodes 114 and 116 in block 20 are back-biased. A ground clamp is on line 34 to counter 32 as previously described.

Upon the arrival of the start pulse, line 24 and accordingly line 26 rise to ground potential. This rise is differentiated by capacitor 100 and resistor 98 and a positive spike passes through diode 102 to the input of the first stage 60 of the character timer. In the original or zero condition the left-side transistor of each of the four stages is nonconducting and the right-side transistor is conducting. The positive input signal into flip-flop 60 is steered to the base of the right-side transistor to turn it off and turn on the left-side transistor. The collector at the left-side rises to ground potential and forward-biases the diode 90 connected to this collector. This diode conducts and line 88 rises to ground potential, as seen by line F of FIGURE 5, where it remains until the end of the character timing period. With line 88 at ground potential transistor 94 cuts off removing the ground clamps from lines 34 and 96 and applies instead a negative potential. This negative potential on line 96 back-biases diode 102, preventing further triggering of character timer 28 by signals on line 26 until the character timing period terminates. Because line 88 is now at ground potential, diode 108 and the diodes in circuit 20 are no longer back-biased. Circuit 20 can now pass actual transitions to the one-shot multivibrator 30, and character timer 28 is conditioned to receive stepping inputs on line 44 from the last stage of counter 32 at the ideal pulse points.

As shown in line A of FIGURE 5 the input signal is a five-level code, and selector 86 in switch 82 is set in the position labeled 5. The collector of the right-side transistor in flip-flop 66 is held at ground potential by this switch and accordingly the left-side transistor is held off. Thus, trigger inputs from the third stage 64 will be ineffective in changing the conducting state of this flip-flop. Character timer 28 is set to count eight input pulses, the first input pulse occurring at the start transition and the remaining seven occurring at the ideal pulse points, the last of which occurs one pulse length into the stop pulse. These eight inputs are seen in line F of FIGURE 5 above the line representing the character timing period. The eight inputs to the character timer 28 causes the counting chain to function in a conventional manner. During the first seven inputs the left-side transistor in at least one of the first three stages is conducting and its collector is at ground. In this manner, line 88 is kept at ground for the first seven inputs. After the seventh input the left side of each of the first three stages is conducting indicating that a count of seven has been attained. The eighth input occurs one pulse length into the stop pulse and sequentially causes each of the first three stages to change their conducting state whereby the right-side transistor of each stage goes conducting. The positive excursion on the right side-collector of flip-flop 64 is applied to flip-flop 66. However, as previously indicated it has no effect on this fourth stage because of the ground clamp on its right-side. The character timer 28 is, therefore, again in its original condition where the left-side transistor of each stage is nonconducting and the right-side transistor is conducting. All of the four diodes 90 are once again back-biased and line 88 falls to its original negative potential level, as seen by line F of FIGURE 5, signifying the termination of the character timing period. The negative clamps are reapplied to diode 108 and diodes 114 and 116 in circuit 20. Transistor 94 goes conducting and its collector rises to ground conditioning, by way of line 96, the capacitor 100, resistor 98 and diode 102 so that a subsequent start pulse can pass. The positive rise on the collector of transistor 94 is applied to counter 32, which insures that this counter is reset and also restores the clamp until the initiation of a subsequent timing period.

When the input signal has a six-level code format, selector 86 is moved to its middle position which removes the clamp from flip-flop 66. Character timer 28 is now set to count nine inputs including the start pulse. The first seven inputs operate the counting chain in the same manner as previously described for a five-level code. Upon the occurrence of the eighth input the trigger output from flip-flop 64 causes flip-flop 66 to change state and its left-side transistor goes conducting. The diode 90, connected to the collector of this transistor, becomes forward-biased, holding line 88 at ground to prolong the character timing period.

The positive rise at the last-named collector is fed back to each preceding stage where it is differentiated by circuit 78 and applied through diode 80 to the conducting right-side transistors. Each stage reverses its conducting state so that its left-side transistor goes on and its right-side cuts off. Because all four flip-flops are now in this conducting state, it is readily seen that this corresponds to a count of 15 in an ordinary four-stage binary counter having no feedback. Accordingly the next input, which is here the ninth, restores the entire counting chain to its zero or original state. Line 88 drops again to its negative potential signifying the end of the character timing period, ending as it did for the five-level code at the time corresponding to one pulse length into the stop period.

For an eight-level code format the switch 82 is set to its third position by which ground is applied to the cathode of diode 84. Character timer 28 will now count eleven inputs including the start input. The first eight input pulses operate the four binary circuits as in the six-level code; however, the feedback pulse from flip-flop 66 serves only to switch circuits 60 and 64. The positive pulse applied to differentiator 78 at flip-flop 62 is shunted to ground by conducting diode 84 so that this feedback has no effect on this flip-flop. Therefore, at the end of the eighth input flip-flops 60, 64 and 66 have their left-side transistor on and their right-side off. Flip-flop 62 is in the opposite conducting state. This corresponds to a count of thirteen in straight four-stage binary counter, and after the reception of three more input pulses, totaling eleven in all, the four flip-flops will reset. In returning to their original state upon the receipt of the eleventh input, the flip-flops cause all diodes 90 to become again reverse-biased. Line 88 drops from ground to its original negative potential level and the character timing period terminates once again one ideal pulse length into the stop pulse.

FIGURE 3 shows the preferred construction of counter 32, converter 38, gate 40, and one-shot multivibrators 30 and 50. The counter 32 is constructed of eight binary stages 131 through 138 connected in cascade. The first four stages, 131 through 134, utilize conventional feedback (not shown) to function as a scale-of-ten counter. The next three stages, 135 through 137, also form a conventional scale-of-five counter by standard feedback technique. The last stage 138 operates as a scale-of-two counter. Thus, the counter will reach a count of 100 before returning to its zero state at the ideal pulse point.

Within block 131 defined by the dotted lines is a flip-flop circuit forming the first stage of counter 32. Stages 132 through 138 are also flip-flop circuits and are constructed identically to the circuit shown in block 131. As seen by the schematic of block 131, the flip-flop is of conventional design and includes two transistors 140 and 142 together with the associated components required for functioning as a bistable multivibrator. The pulse input to stage 131 from oscillator 36 is brought via line 144 through differentiating circuits 145, and 147 and through steering diodes 146 and 148 to the bases of transistors 140 and 142. The output from the collector of transistor 142 is transmitted via line 150 to stage 132 where it passes through differentiating circuits and steering diodes to the transistors in that stage in like manner. Similarly, the output from the collector of the right-side transistor in each stage 132 through 137 provides the input to the next stage 133 through 138, respectively. Initially the right-side transistor in each stage 131 through 138 is conducting and the left-side transistor in each stage is nonconducting. A stage in this condition shall be referred to as being off. Conversely, when the left-side transistor is conducting and the right-side transistor nonconducting, the stage shall be considered on.

The steering diodes in each stage pass only positive differentiated pulses which are always applied to the base of the conducting transistor in a stage causing it to go nonconducting and hence driving the other transistor to a conducting condition. This operation is true whether the input to a stage is from oscillator 36 to stage 131 or from one of the stages 131 through 137 to the next stage 132 through 138.

In the first four stages, 131 through 134, feedback (not shown) causes operation as a scale-of-ten counter in well-known manner. These stages count in the normal manner from a count of zero (all four stages off) to a count of seven (stages 131, 132, and 133 on, and stage 134 off). At count eight stage 134 turns on and stages 131, 132, and 133 turn off. Feedback from stage 134 to stages 132 and 133 turns these latter two stages on again. Thus, after the count of eight stage 131 is off and stages 132, 133, and 134 are on. Count nine turns stage 131 on, and count ten turns all the stages off, or back to the zero condition. This tenth pulse also turns on stage 135, which indicates a count of ten. After the next series of ten counts, stage 135 is turned off and stage 136 is turned on, indicating a count of twenty. Ten pulses later stage 135 is again turned on, and a count of thirty is shown by both stage 135 and stage 136 being on. Ten pulses later stages 135 and 136 are turned off and stage 137 is turned on. Feedback (not shown) from stage 137 to stage 135 and 136 turns these latter two stages on, and a count of forty is designated by stages 135, 136, and 137 all being on. Ten pulses later stages 135, 136, and 137 are turned off and stage 138 is turned on. Thus, a count of fifty is designated. Stages 131 through 137 repeat this operation during the next fifty input pulses, at the completion of which stage 138 is turned off. Thus, at the end of 100 input pulses the entire counter has returned to its zero state signifying the completion of an ideal pulse period.

Character timer 28 clamps line 34 to essentially ground prior to receipt of a character. This clamp is passed via diodes 152 to the collector of the right-side transistor 142, and hence to the base of the left-hand transistor 140, holding transistors 142 on and 140 off. In this manner counter 32 is prevented from responding to pulses from oscillator 36 until the clamp is removed by actuation of the character timer 28. The counter 32 then repeatedly cycles as described above until the character timer 28 has counted the necessary number of ideal pulse points and the character timing period ends. At this time line 34 undergoes a positive rise to ground, restoring the clamp and also insuring that the complete counting chain is reset by application of the positive rise to all stages by the diodes 152.

The collectors of the left-side transistors 140 of the first seven stages 131 through 137 of counter 32 are connected by lines 154 to converter 38. Within the converter each line 154 terminates at the junction of a resistor 156 and the cathode of a diode 160. These seven resistors 156 are connected in a parallel network terminating in line 39. In a similar manner, the collectors of each of the right-side transistors 142 of stages 131 through 137 are connected via lines 162 to converter 38 where each line terminates at the junction of a resistor 166 and the cathode of a diode 164. These seven resistors 166 are connected in a parallel network terminating in line 41. The anode of each of the diodes 160 and 164 is connected to a source of —6 v.

In each stage of the counter 32 there will always be one conducting transistor and one nonconducting transistor. The collectors of these transistors determine with the —6 v. source, whether diode 160 or 164 is forward- or back-biased as follows. When a particular transistor is conducting, its collector will be essentially at ground potential. This ground and the —6 v. supply associated with diode 160 or 164 will back bias the diode 160 or 164. Therefore, the line 154 or 162 will be clamped to essentially ground, and no current will flow through the corresponding resistor 156 or 166 to line 39 or 41. When a transistor is nonconducting, its —18 v. supply and the —6 v. supply associated with its diode 160 or 164 will forward bias its diode 160 or 164. Hence, its line 154 or 162 will be clamped to —6 v. providing a stable supply voltage, and this voltage will cause current to flow through the corresponding resistor 156 or 166 to line 39 or 41 under conditions hereinafter described.

The resistors 156 and 166 associated with the stages 131 through 137 are weighted inversely with the count level associated with that one particular stage. For example as shown in FIGURE 3, the resistors 156 and 166 associated with stage 131, which represents a count of one, are each 100,000 ohms; those associated with stage 132 representing a count of two, are each 50,000 ohms; those with stage 133, a count of four, are each 25,000 ohms; stage 134, a count of eight minus six, or two, are each 50,000 ohms; stage 135, a count of ten, are each 10,000 ohms; stage 136, a count of twenty, are each 5,000 ohms; and stage 137, a count of forty minus thirty, or ten, are each 10,000 ohms. Since each resistor 166 is connected to —6 v. when its stage is on, the current through each resistor 166 will be directly proportional to the partial count represented by that particular stage, and the total current in line 41, being the sum of the currents through all the resistors 166, will be proportional to the total count level of stages 131 through 137. This current in line 41 will be at a minimum at a count level of zero, and it will incrementally rise to a maximum at count level of 49. At count 50 it will again drop to its minimum value, and it will again rise incrementally, reaching its maximum at count 99. Similarly, since each resistor 156 is connected to —6 v., when a stage is off the current through its resister 156 will be directly proportional to the partial count represented by that stage. The total current in line 39 is the sum of the currents through all the resistors 156, and it is a maximum at a count of zero, and it decreases incrementally to its maximum value at a count of 49. At count 50 it returns to its maximum value and again decreases incrementally, reaching its minimum at count 99.

Gate 40 contains two transistors 170 and 172. The collector of transistor 170 is connected to line 41, and the collector of transistor 172 is connected to line 39. The base of transistor 170 is connected through a biasing resistor 174 to line 43 which connects to the collector of the left-side transistor 140 in stage 138, the last stage of counter 32. The base of transistor 170 is also connected through a biasing resistor 176 to a source of +5 v. The base of transistor 172 is connected through a biasing resistor 174 to line 42 which connects to the collector of the right-side transistor 142 in counter stage 138. The base of transistor 172 is also connected through a biasing resistor 176 to a source of +5 v. The emitter of each transistor is connected to line 45.

While counter 32 is counting from zero to 49, right-side transistor 142 in stage 138 is conducting. As a result, its collector, and hence line 42, are at ground potential. This places +5 v. across biasing resistors 174 and 176. Transistor 172 is, therefore, held nonconducting during the count of zero to 49. Right-side transistor 140 in stage 138 is nonconducting, and so its collector and line 43 are at a potential of —18 v. Biasing resistors 174 and 176 are proportioned such that they, together with the —18 v. on line 43 and the +5 v. source, bias the base of transistor 170 to an appropriate negative potential, and transistor 170 is conducting during the count of zero to 49.

The current passed by transistor 170 during the counts of zero to 49 is that carried by line 41, and this current rises in equal increments from a minimum at count zero to a maximum at count 49. At count 50 transistor 140 in stage 138 goes conducting, and transistor 142 nonconducting. This reverses the biasing of transistors 170 and 172. Transistor 170 turns off and transistor 172 starts to conduct. This condition exists until counter 32 reaches a count of 100, corresponding to its zero condition, and commences another cycle. Thus, during the count of 50 to 99 transistor 172 is conducting. While transistor 172 is conducting, the current passed is that on line 39. This current decreases in equal increments from a maximum at count 50 to zero at count 99. Because the resistors 156 and 166 associated with any stage of counter 32 are equal, all incremental steps on the rising and falling staircase are equal.

The output current on line 45 is equal to the currents passing through transistors 170 and 172, and for the character timing period is shown in line B of FIGURE 5 as a sawtooth waveform. Actually, as just explained, each sawtooth has a staircase outline and changes incrementally from a minimum at count zero to a maximum at counts 49 and 50, and then back to a minimum at counts 99 and 100 (count zero of the next cycle). This staircase is shown enlarged in line G of FIGURE 5.

One-shot multivibrator 30 is of conventional design and includes transistors 180 and 182 and associated circuitry. The emitter of each transistor 180 and 182 is connected to a source of +2.1 v. The collector of transistor 182 is connected through diode 184 to line 48, and from there to line 45. The collector of transistor 180 is connected through conventional output circuitry to indicator circuit 54 by line 49. The base of transistor 182 is connected to circuit 20 from which it receives its triggering input in response to selected actual transitions. In the stable state transistor 182 is conducting and transistor 180 nonconducting. The collector of transistor 182 is at approximately 2.1 v. and line 45 is clamped to this level.

During the time that one-shot 30 is in its stable state the current out of gate 40 flows through transistor 182 in one-shot 30. The complete path is from the —6 v. source, through the appropriate diodes 160 or 164, the appropriate weighted resistors 156 or 166, line 39 or 41, transistor 170 or 172, lines 45 and 48, transistor 182 in one-shot 30, and to the +2.1 v. source. When one-shot 30 is triggered by the differentiated signal from circuit 20 in response to actual selected transitions in the incoming signal, it switches to its unstable state for fifteen microseconds. The collector of transistor 182 drops to —18 v. and back-biases diode 184, removing the clamp from line 45. The operation of this clamp is represented by line E in FIGURE 5.

One-shot multivibrator 50 is also of conventional design, and, except for component values, is identical with one-shot 30. In one-shot 50, the collector of the normally nonconducting transistor is connected via diode 184 to line 45. Because this collector is at negative potential, its diode 184 is normally back-biased and one-shot 50 does not affect line 45. Positive pulses from oscillator 36 are differentiated and passed through diode 186 to trigger one-shot 50. When triggered, one-shot 50 switches to its unstable state for 4 microseconds, forward biasing its diode 184 and allowing any current on line 45 to flow through its conducting transistor to a +2.1 v. source.

Prior to receipt of character every stage of counter 32 is off, and only nominal current is flowing in line 45. The start pulse triggers character timer 28 which removes the clamp from line 34, permitting counter 32 to commence counting pulses from oscillator 36. The current out of gate 40 on line 45 goes through the cycle shown in line G of FIGURE 5. The clamp of one-shot 30 is operative and this current is shunted through one-shot 30. When an actual transition occurs, a pulse on line 20 triggers one-shot 30, and for 15 microseconds the clamp is removed from line 45. If the actual transition is displaced with respect to an ideal transition point, then during this fifteen-microsecond time period the current on line 45 flows to indicating circuit 46 to cause an exact measurement of distortion based on the value of this current. If during this fifteen-microsecond period oscillator 36 emits a pulse, counter 32 changes to a new count, and the current on line 45 also changes. Absent one-shot 50, transient current might cause a false reading in indicator 46. However, one-shot 50 is triggered by oscillator 36 and for four microseconds this one-shot shunts the current on line 45 away from indicator circuit 46 to provide time for counter 32 and converter 38 to stabilize. This four microsecond period is sufficiently short as not to prevent normal operation during the remainder of the fifteen microsecond period.

The collector of right-side transistor 142 in stage 138 of counter 32 is connected via line 44 to character timer 28 to provide stepping pulses at the ideal pulse points. The collectors of both transistors 140 and 142 in stage 138 are connected, via lines 53 and 52, respectively, to indicator circuit 54 to assist in classifying the type of distortion as hereinafter described.

FIGURES 4 and 6 disclose the indicating circuits shown in FIGURE 1 by blocks 46 and 54. In FIGURE 4, the immediate value of the changing current out of gate 40 flows by line 45 through resistor 220 for fifteen microseconds when one-shot multivibrator 30 is triggered, and the voltage developed across this resistor controls the conducting of emitter follower amplifier 222. The output voltage of amplifier 222 is proportional to the input voltage developed across the resistor 220. This output is dumped into storage capacitor 224 through conducting diode 226 to bias the grid of tube 228.

Tube 228 is a cathode follower amplifier whose output is taken across resistor 232 and whose output voltage is proportional to the charge of capacitor 224. The meter-drive circuit is connected to the output of tube 228 and is formed as a bridge having two identical transistors 234 and 236 with emitter resistors of equal value. Transistor 236 has a variable resistor 238 connected to its base for balancing the bridge so that meter 230 gives a zero reading for an undistorted input.

For a distorted input the current through resistor 220 causes the base of transistor 222 to go negative. The output voltage of this transistor becomes negative and a negative charge is put on capacitor 224. This negative charge on capacitor 224 decreases the conduction of tube 228 and its output voltage becomes negative in proportion to this charge. Accordingly, the base bias increases negatively and transistor 234 conducts more. When the conduction of transistor 234 increases, the bridge becomes unbalanced and current flows through meter 230. Deflection of the meter is thus proportional to the charge on capacitor 224, and accordingly, to the precise value of current present at the output of gate circuit 40 when one-shot 30 removes the clamp in response to a selected transition. The face (not shown) of the meter is graduated in percent distortion so that an exact value of distortion can be read.

When switches 240 and 246 are in the PEAK position as shown, the apparatus will indicate the highest value of distortion regardless of the type or the cause. With these switches so positioned the charge on capacitor 224 represents the peak input from emitter follower 222. The negative charge on this capacitor back-biases diode 226 so that, until a negative voltage greater than this negative charge appears at the output of emitter follower 222, diode 226 remains off. When this output voltage does exceed the voltage present on capacitor 224, diode 226 conducts and the increase in voltage is dumped into this capacitor to cause a new peak distortion reading. Capacitor 224 is discharged by depressing reset switch 242 which forward-biases diode 244.

For average distortion readings switches 240 and 246 are moved to the AVERAGE position. Bias and end distortion are measured in this position. When switch 240 is in this position, any negative voltage applied to capacitor 224 causes diode 244 to be forward-biased and places the large resistance 250 in parallel with capacitor 224. Capacitor 224 can therefore discharge slowly through this resistance. When switch 246 is in this position capacitor 248 parallels resistor 232 in the cathode circuit of tube 228. This capacitor 248 has a large value and it retards any sudden change in the output voltage of tube 228.

The measurement of average distortion effects a damping of the meter movement in response to changes in the amount of distortion of the input telegraph signal. For example, an increase in distortion will cause a greater voltage to be dumped into capacitor 224. However, some of this increase will discharge through resistor 250. Also, capacitor 248 will prevent the immediate increase in output voltage caused by reduction in conduction of tube 228. It has been found in practice that it takes about five actual measured transitions for the meter 230 to reach the correct reading of distortion when making an average measurement. By example if capacitor 224 was initially uncharged and a sufficient charge was applied to this capacitor to give a peak reading of ten percent distortion, it would take approximately five transitions for the meter to advance to the ten percent mark. Therefore, unless the new distortion level exists for at least these five transitions, the meter will not totally reflect his change.

Once the meter attains a correct reading, then so long as this new distortion level remains, the meter will hold this reading because any discharge of capacitor 224 between selected actual transitions will be replaced when the next actual transition occurs. However, if the amount of distortion present decreases, then capacitor 224 and capacitor 248 will slowly change their state of charge and the meter will drop to the correct distortion reading. In practice it has been found that for a drop in the level of distortion the meter will lose about ten percent of its old reading during each character-timing period until it reaches the new reading.

FIGURES 6 is the schematic of the indicator flip-flop 54. The flip-flop as shown is conventional in design with the following exceptions. The collector circuits of transistors 252 and 254 include switches 256, 258 and lamps 260 and 262, respectively. Switches 256 and 258 are ganged with each other and with switches 118 and 120 in circuit 20. In operation, positive pulses from the second output of one-shot multivibrator 30 are applied during the fifteen microsecond clamping period to two differentiating circuits 264 and 266 connected to the bases of transistors 252 and 254, respectively. This positive pulse waveform from one-shot 30 is the inverse of line E, FIGURE 5. These two differentiating circuits are conditioned by the last stage of counter 32. Circuit 264 is conditioned to differentiate the input from multivibrator 30 when ground is present on line 52 during the first half of the ideal pulse period. See line D of FIGURE 5. Differentiator 266 is conditioned when line 53 is at ground during the last half of the ideal pulse period. See line C of FIGURE 5.

The character shown in line A of FIGURE 5 will be referred to for the purpose of describing the operation of the indicator flip-flop 54. As explained previously this character is illustrative because the same type of marking and spacing distortion will seldom occur in a character or a series of successive characters. For example, if marking end distortion occurs in a character or in a series of closely-spaced characters, it is unlikely that there would also be spacing end distortion present. Nevertheless, it is possible to have mixed types of distortion in the same character such as marking bias distortion and spacing end distortion.

The arrival of the early space-to-mark transition shown in line A occurs during the last half of the ideal pulse period when the left-side of stage 138 is conducting and line 53 is at ground. Assume that switches 256, 258 are in the S–M position shown, which signifies measurement of the space-to-mark transitions for detecting bias distortion. The positive pulse from one-sot 30 is differentiated at 266 and applied to the base of transistor 254 to turn it off if it is on, or keep it off if it is already nonconducting. Transistor 252 conducts and current flows through transistor 252, through the S–M position of switch 256 and through lamp 260 labeled MARK, illuminating this lamp. By observing that the MARK lamp is lit and that switches 256 and 258 are in the space-to-mark position, the operator knows that marking bias is present and can look at meter 230 in circuit 46 for the value of distortion. The MARK lamp stays illuminated for successive characters because there are no late space-to-mark transitions to cause the flip-flop 54 to change conducting states, and the operator has sufficient time to make his observations.

When spacing bias as shown in the fourth pulse of line A, FIGURE 5, is present in the incoming signal, it too occurs on the space-to-mark transition. However, marking bias would ordinarily not be present. Line D of FIGURE 5 shows that the right-side of stage 138 in counter 32 is conducting, which puts line 52 at ground. The positive pulse arriving from one-shot 30 at the actual space-to-mark transition is differentiated by differentiating circuit 264 and applied to the base of transistor 252 cutting it off. Transistor 254 goes conducting and a circuit is completed through this transistor, the S–M position of switch 258, and the lamp 262, illuminating this lamp. Because transistor 252 is no longer conducting, lamp 260 turns off. Lamp 262 is the "SPACE" lamp and by observing that this lamp is illuminated, and that the switches 256, 258 are in the S–M position the operator knows that spacing bias is present and looks to meter 230 for the amount of distortion.

For measurements of end distortion, switches 256, 258 and 118, 120 are put in the M–S position. By referring to lines A and D of FIGURE 5 it is seen that marking end distortion occurs when the right-side collector of stage 138 is at ground. The positive pulse out of one-shot 30 at the actual mark-to-space transition is differentiated at 264 and applied to the base of transistor 252. If transistor 252 is conducting, it cuts off, and if already nonconducting, it remains so. In either event transistor 254 conducts and a circuit path is completed through this transistor, the M–S position of switch 258, over to the S–M position of switch 256, and through MARK lamp 260 illuminating this lamp. With the MARK lamp lit and the switches in the M–S position, an indication of marking end distortion is made and the value of this distortion is read off of meter 230. For spacing end distortion the left-side collector of stage 138 is at ground (line C) when the actual transition occurs and because line 53 is also at ground, the positive pulse out of one-shot 30 is differentiated by circuit 266 and applied to the base of transistor 254 making or keeping it nonconducting. Transistor 252 is therefore conducting and a circuit path is completed through this transistor, the M–S position of switch 256, over to the S–M position of switch 258, and through SPACE lamp 262 illuminating this lamp. With the SPACE lamp lit and the switches in the M–S position an indication of spacing end distortion is made and the value of the distortion is read off of meter 230.

When these four switches 118, 120, 256, 258 are moved to the position designated TOTAL, all transitions after the start pulse are measured. However, insofar as flip-flop 54 is concerned the lamps 260 and 262 will not necessarily give a valid indication if more than one type of distortion is present in the incoming signal. For example, if both marking bias and marking end distortion are in the same character, the operation of flip-flop 54 would be such that the lamps 260 and 262 would alternatively light during the character time and due to the speed of the incoming characters, these two lamps would rapidly flicker. Therefore, although a total reading could be obtained on the meter 230, movement of the switches to the M–S or S–M positions would be necessary to identify the types of distortion.

Synchronous telegraph signals are also capable of being measured by the aforedescribed measuring apparatus even though such signals are not separated into characters having start and stop pulses. Since any mark-to-space transition starts the character timer, the distortion measurements occur at the actual transitions following an initial mark-to-space transition. The measuring operation is as described above for start-stop telegraph signals and the measurements continue until the character timer concludes its timing period. Subsequently, the next mark-to-space transition in the pulse train following the termination of the previous character timing period restarts the character timer for another measurement period. In effect, with a synchronous signal input, the set looks at groups of incoming pulses, each group defined by a character timing period. Any measurement of distortion which is displayed on the meter will be corect providing end distortion does not exist on the particular mark-to-space transition which the apparatus considers as a start pulse.

As described, the character timer 28 is advanced at the ideal pulse points by the last stage of counter 32, and the timing period terminates one ideal pulse length into the stop pulse. In the event that the characters of the telegraph signal contain a unit stop pulse, then it is obvious that the character timer would reset at the same time when the start pulse in the next character arrives. In order to have the present apparatus compatible with such signals, a simple modification can be made so that the character timer is advanced at the half-ideal pulse points thereby terminating the timing period one-half ideal pulse into the stop pulse. To this end, line 44 is connected to line 43, rather than to line 42, which in effect connects the character timer to the collector of the left-side transistor in stage 138 of counter 32. As seen by line C of FIGURE 5, this transistor undergoes a positive transition at each half-ideal pulse point. These positive transitions provide the stepping inputs for the character timer 28.

It will be apparent that various modifications may be made to the disclosed apparatus within the spirit and scope of the invention and it is desired, therefore, that only such limitations be placed on the invention as are imposed by the prior art and set forth in the appended claims.

What I claim is:

1. Pulse distortion testing apparatus for measuring and indicating the distortion of pulses in a pulse train comprising timing means responsive to a pulse transition in the pulse train for initiating a timing cycle, means for generatng pulses at a rate which is a multiple of the rate of the pulses in the pulse train, means for counting the pulses generated by said generating means during said timing cycle, means for continuously converting the changing count in said counting means to a changing current, an indicating circuit, and means responsive to transitions in the pulses in the pulse train for applying the immediate value of said current occurring at said transitions to said indicating circuit whereby an indication of distortion of pulses in the pulse train is effected.

2. Pulse distortion testing apparatus for measuring and indicating the distortion of pulses in a pulse train comprising timing means responsive to a pulse transition in the pulse train for initiating a timing cycle, means for generating pulses at a rate which is a multiple of the rate of the pulses in the pulse train, counting means for counting the pulses generated by said generating means during said timing cycle, means for converting the changing count in said counting means to a changing current, gating means connected to said converting means, an indicating circuit, and means responsive to selected transitions in the pulses in the pulse train for applying the immediate value of said current occurring at each selected transition from said gating means to said indicating circuit whereby an indication of distortion of pulses in the pulse train is effected.

3. Pulse distortion testing apparatus for measuring and indicating the distortion of pulses in a pulse train comprising timing means responsive to a pulse transition in the pulse train for initiating a timing cycle, means for generating pulses at a rate which is a multiple of the rate of the pulses in the pulse train, counting means for counting the pulses generated by said generating means during said timing cycle, means for continuously converting the changing count in said counting means to a changing current, said converting means having two channels, gating means, both of said two channels being connected to said gating means to apply thereto the current from said converting means, means for actuating said gating means to pass alternately the current in each of said channels, an indicating circuit, and means responsive to selected actual transitions in the pulses of the pulse train for applying the immediate value of current at the output of said gating means to said indicating circuit whereby an indication of distortion of pulses in the pulse train is effected.

4. Apparatus as claimed in claim 3 further comprising means for applying an output from said counting means periodically to said timing means to advance said timing means during said timing cycle.

5. Pulse distortion testing apparatus for measuring and indicating the distortion of pulses in a pulse train comprising timing means responsive to a pulse transition in the pulse train for initiating a timing cycle, means for generating pulses at a rate which is a multiple of the rate of the pulses in the pulse train, counting means for counting the pulses generated by said generating means, means for applying an output from said counting means periodically to said timing means to advance said timing means during said timing cycle, means for continuously converting the changing count in said counting means to a changing current, said converting means having two channels, each channel having a plurality of weighted resistors for determining the value of current flowing therethrough in response to the count in said counting means, gating means, both of said channels being connected to said gating means to apply thereto the current from said converting means, means for actuating said gating means to pass alternately the current in each of said channels, an indicating circuit, monostable means preventing flow of said current from said gating means to said indicating circuit, and means responsive to selected actual transitions in the pulses in the pulse train for triggering said monostable means to permit flow of the immediate value of current at the output of said gating means to said indicating circuit whereby an indication of distortion of pulses in the pulse train is effected.

6. Pulse distortion testing apparatus for measuring and indicating the distortion of pulses in a pulse train comprising timing means responsive to a pulse transition in the pulse train for initiating a timing cycle, pulse generating means, means for counting the pulses generated by said generating means, means for continuously converting the changing count in said counting means to a changing current, an indicating means, means responsive to transitions in the pulses in the pulse train for applying during said timing cycle the immediate value of said current occurring at said transitions to said indicating means whereby an indication of distortion of pulses in the pulse train is effected, and means responsive to said generating means for temporarily preventing the application of said current to said indicating means upon receipt of a pulse from said generating means.

7. Pulse distortion testing apparatus for measuring and indicating the distortion of pulses in a pulse train comprising timing means responsive to a pulse transition in the pulse train for initiating a timing cycle, means for generating pulses at a rate which is a multiple of the rate of the pulses in the pulse train, counting means for counting the pulses generated by said generating means, means for applying an output from said counting means periodically to said timing means to advance said timing means during said timing cycle, means for continuously converting the changing count in said counting means to a changing current, said converting means having two channels, gating means, both of said two channels being connected to said gating means to apply thereto the current from said converting means, means for actuating said gating means to pass alternately to its output the current in each of said channels, an indicating circuit, means responsive to selected actual transitions in the pulses of the pulse train for applying the immediate value of current at the output of said gating means to said indicating circuit whereby an indication of distortion of pulses in the pulse train is effected, and means responsive to said generating means for temporarily preventing the application of current from the output of said gating means to said indicating circuit upon receipt of a pulse from said generating means.

8. Pulse distortion testing apparatus for measuring and indicating the distortion of pulses in telegraph characters comprising input means for receiving said characters, character timing means activated by the arrival of a start pulse in a character for initiating a character timing period, a pulse generator, a counter for cyclically counting the output of said pulse generator, the end of each cyle establishing an ideal transition point and the end of an ideal pulse period, means for continuously converting the changing count in said counter to a changing current during each ideal pulse period, said current being at a minimum at each ideal transition point and at a maximum between adjacent ideal transition points, an indicating circuit, means responsive to actual transitions in the character for applying to said indicating circuit during said character timing period the immediate value of current occurring at said actual transitions, said value being indicative of the displacement of an actual transition in the character from an ideal transition point established by said counter.

9. Pulse distortion testing apparatus for measuring and indicating the distortion of pulses in telegraph characters comprising input means for receiving said characters, character timing means activated by the arrival of a start pulse in a character for initiating a character timing period, a pulse generator, a counter for cyclically counting the output of said pulse generator, the end of each cycle establishing an ideal transition point and the end of an ideal pulse period, means for continuously converting the changing count in said counter to a changing current during each ideal pulse period, said current being at a minimum at each ideal transition point and at a maximum between adjacent ideal transition points, gating means connected to said converting means, an indicating circuit, means responsive to actual transitions in the character for applying during said character timing period the immediate value of current occurring at said actual transitions from said gating means to said indicating circuit, said value being indicative of the displacement of an actual transition in the character from an ideal transition point established by said counter, and means for applying an output from said counter to said character timing means during each ideal pulse period to advance said character timing means.

10. Pulse distortion measuring apparatus comprising an input circuit for receiving telegraph signals formed as characters which contain the pulses to be measured, a character timer initiated by the start pulse of each character for generating a character timing period, a pulse generator generating pulses at a rate which is a multiple of the pulse rate of the pulses in said characters, a counter for counting the output pulses of said generator, means controlled by the character timer for initiating and terminating the operation of said counter during the character timing period, a binary circuit forming the last stage of said counter and operative to change conducting states continuously during the character timing period at the points corresponding to ideal and one-half ideal transition points, means for applying an output from said counter to said character timer at predetermined ones of said points to advance said character timer, means for continuously converting the changing count in said counter to a changing current, said converting means including a plurality of weighted resistors for determiing the value of the total current flowing therethrough, two gates connected to said converting means and having common output, each of said gates alternately being gated to pass current from said converting means in response to the conducting state of said binary circuit whereby the output of said gates forms a sawtooth current waveform, each sawtooth having an ascending and descending staircase with the maximum occurring at a half-ideal transition point and the minimum occurring at an ideal transition point, an indicating circuit connected to the output of said gates, a monostable multivibrator connected to the output of said gates to clamp the output out of said gates, said multivibrator being further connected to the input circuit and adapted to be triggered by selected transitions of the pulses in the incoming characters to remove the clamp from said gates and permit the immediate current present at the output of said gates at each selected transition to pass to said indicating circuit to effect an indication of distortion.

11. Pulse distortion measuring apparatus comprising an input circuit for receiving telegraph signals formed as characters which contain the pulses to be measured, a character timer initiated by the start pulse of each character for generating a character timing period, a pulse generator generating pulses at a rate which is a multiple of the pulse rate of the pulses in said characters, a counter for cyclically counting the output pulses of said generator, the end of each cycle establishing ideal transition points for the pulses in the measured character, means responsive to the character timer for initiating and terminating the operation of said counter during the character timing period, said counter comprising a plurality of binary circuits each having first and second outputs, the last binary circuit operative to change conducting states continuously during the character timing periods at the points corresponding to ideal and one-half ideal transition points, means for applying an output from said counter to said character timer at predetermined ones of said points to advance said character timer, means for continuously converting the changing count in said counter to a changing current, said converting means comprising a weighted resistor connected to each output of each of said plurality of binary circuits except the last, each resistor in said first output of each binary circuit being connected in a first parallel circuit and each resistor in said second output being connected in a second parallel circuit, two gates connected to said converting means and having a common output, one gate being connected to said first parallel circuit and to the first output of said last binary circuit and the other gate being connected to said second parallel circuit and to the second output of said last binary circuit, each of said gates alternately being gated to pass current from one of said parallel circuits in response to the conducting state of said last binary circuit, an indicating circuit connected to the output of said gates, a monostable multivibrator connected to the output of said gates to clamp the output out of said gates, said multivibrator being further connected to the input circuit and adapted to be triggered by selected transitions of the pulses in the incoming characters to remove the clamp from said gates and permit the immediate current present at the output of said gates at each selected transition to pass to said indicating circuit to effect an indication of the amount of distortion, and a second indicating circuit connected to the outputs of said last binary circuit and adapted to receive an input from said monostable multivibrator at each selected transition to effect an indication of the type of distortion.

References Cited

UNITED STATES PATENTS

| | | | |
|---|---|---|---|
| 3,025,349 | 3/1962 | Peterson | 178—69 |
| 3,189,733 | 6/1965 | Cannon et al. | 178—69 |

THOMAS A. ROBINSON, *Primary Examiner.*

U.S. Cl. X.R.

328—162

UNITED STATES PATENT OFFICE
CERTIFICATE OF CORRECTION

Patent No. 3,420,950                                                   January 7, 1969

James E. Britt

It is certified that error appears in the above identified patent and that said Letters Patent are hereby corrected as shown below:

Column 10, line 15, "maximum" should read -- minimum --. Column 13, line 47, "one-sot" should read -- one-shot --. Column 14, line 64, "corect" should read -- correct --.

Signed and sealed this 17th day of March 1970.

(SEAL)
Attest:

Edward M. Fletcher, Jr.
Attesting Officer

WILLIAM E. SCHUYLER, JR.
Commissioner of Patents